UNITED STATES PATENT OFFICE.

AXEL THEODOR KONSTANTIN ESTELLE AND KARL WILHELM HENRIK EVERS, OF FLISERYD, SWEDEN, ASSIGNORS TO NYA ACKUMULATOR AKTIEBOLAGET JUNGNER, OF FLISERYD, SWEDEN, A COMPANY.

ELECTRICAL ELEMENT.

979,064.  Specification of Letters Patent.  Patented Dec. 20, 1910.

No Drawing.  Application filed May 12, 1909.  Serial No. 495,561.

*To all whom it may concern:*

Be it known that we, AXEL THEODOR KONSTANTIN ESTELLE, engineer, and KARL WILHELM HENRIK EVERS, lieutenant, residing at Fliseryd, Sweden, and subjects of the King of Sweden, have invented certain new and useful Improvements in Electrical Elements; and we do hereby declare the following to be a full, clear, and exact description of the invention, such as will enable others skilled in the art to which it appertains to make and use the same.

The invention relates to an active mass for the negative electrodes of primary and secondary electric elements with alkaline electrolyte.

Of all metals which have been proposed for the active mass of negative electrodes for primary and secondary electrical elements with alkaline electrolyte, iron has been considered the most suitable. This is not only owing to the cheapness of the metal but also and particularly owing to the fact that the potential energy obtained by this metal when opposed to a positive electrode of any kind in a galvanic battery is greater than when using any of the other proposed metals. A particular disadvantage is, however, connected with the employment of iron, namely that the oxidation products formed on discharge of the electrode, have very little and insufficient conductive capacity, so that the iron mass must necessarily be mixed with a suitable conductive substance. When this is done new difficulties arise.

The conductive substances usually hitherto used are graphite, copper and mercury and each such conductor forms, together with the iron a galvanic element, which causes local action and the oxidation of the iron, or in other words, it discharges itself. To the same degree as this self-discharge takes place the conductor is polarized by the hydrogen gas, which collects upon the same, thus causing the galvanic action to cease. The gas however collects in bubbles and escapes and consequently the self-discharge is continued to a corresponding degree, especially when copper or graphite is used. When using mercury the case is more favorable, although the difference of potential will then be greater. The addition of copper as a conductive substance causes also a further disadvantage in addition to the self-discharge mentioned above. If the discharge is carried on too long or if the element is charged backward which frequently occurs in separate elements of batteries used for instance in automobiles, the copper is dissolved and this not only causes a decrease in the conductive capacity and thus a decrease in the efficiency of the element, but has also a damaging influence upon the insulation within the battery. If for instance an organic substance, for instance ebonite, is used for the insulation of the electrodes, the copper is precipitated thereon and this in turn causes a short circuit within the element. As to graphite, its conductive capacity is not very high and for this reason the proportion of this material to the active mass must be rather considerable, and thus occupies too much space in the electrode.

From the above it will be seen that, whatever conductive substance of those hitherto proposed is used, the disadvantages under all circumstances are very considerable.

Another metal which has been proposed as an active substance in negative electrodes of the kind mentioned above is cadmium, a metal, which for several reasons is especially adapted for the purpose in question. The heat of formation of the cadmium is only slightly lower than that of ferrous oxid, and cadmium therefore gives a potential energy nearly as high as that of iron. Furthermore oxid of cadmium as well as the oxidation compounds formed by the discharge of this metal have a considerable conductive capacity, so that it will not be necessary to add any particular conductive substance to the active mass. Further it may be stated that an electrode of cadmium does not show any tendency to self-discharge. One disadvantage of the use of this metal is however its comparatively high price and another disadvantage is that the metal is very soft, which causes it to easily cake, and in the same degree as its finely divided state is transformed into a solid one, the capacity is decreased. We have, however, made the observation that if iron and cadmium are used simultaneously and in suitable proportions in a negative electrode particularly great advantages are obtained, as not only the favorable characteristics of the two metals complement each other, but also the most essential disadvantages are practically eliminated. As the oxygen compounds of cadmium are conductive, the mass of cadmium being in itself an active material can thus serve as a conductive substance for the iron mass. In this property it has the advantage compared with the other conductive substances mentioned above of preventing or almost preventing self-discharge of the iron, since the difference of potential between this metal and cadmium is a minimum. The admixture of cadmium to the active iron mass also involves other advantages, which are briefly indicated as follows:

It has been mentioned above that the employment of other conductive substances such as copper, causes a self-discharge of the element. If the element is adjusted in such manner that the capacity of the positive electrode corresponds to the high potential of the iron and the element is not immediately discharged, it will occur that the iron-electrode, which in the meantime has been partially self-discharged, will also do so with a low potential, whereby some ferrous-iron is transformed to ferric-iron reducible with difficulty, which on charging is partly dissolved forming alkali-ferrite and which in addition enters into the positive electrode and decreases the capacity of the latter.

If the iron is mixed with cadmium the noteworthy fact will occur that the discharge of the iron takes place according to a single curve of potential, namely the high potential curve. This is of great importance, as if the iron cannot discharge its low potential, no ferric compounds can be formed, and the disadvantages arising by the formation of such compounds, can thus be avoided.

By the addition of cadmium a charging curve in two stages is obtained; the first part in each curve representing the charging potential for cadmium and the other part the potential for iron. By this fact it becomes possible to determine, owing to the potential conditions, when the accumulator is fully discharged or what quantity of energy must be charged into a partially discharged accumulator in order to complete the charge. As the mutual relation between the two potential curves always remains constant, it will only be necessary to observe the number of charged ampere hours, from the moment when the potential begins to increase, and then to charge once an equal quantity, if the capacities of the cadmium and the iron are equal, or otherwise a quantity in proportion to the relation between said capacities.

In addition the above mentioned tendency of the cadmium to cake or clod is decreased or sometimes quite disappears when the same is mixed with the iron mass. When the proportions of both metals are properly balanced, the grains of cadmium will be perfectly separated from each other by the grains of iron. Should it happen however that the capacity decreases owing to caking or clodding taking place it is sufficient to charge backward or to anode-electrolyze the electrode in the alkaline electrolyte whereby the capacity is again raised to its original value. This method is not practicable, when the mass consists only or to an essential degree of cadmium. The conductive substance being at the same time an active material and as the theoretical capacity of the iron is about twice as great as that of cadmium, reckoned per unit of weight of the metal, the result will be that both metals when mixed in suitable proportions have a greater specific capacity than that obtained with cadmium alone or with iron in combination with any other inactive conductive substance. The most suitable proportions for ordinary requirements appears to be equal parts by weight of metallic iron and cadmium. With a greater proportion of cadmium the efficiency is increased but also the price and therefore the most suitable mutual proportions between the two metals must be determined in each particular case.

We claim:—

Active mass for negative electrodes of alkaline accumulators consisting of a mixture of metallic iron and metallic cadmium both in finely divided state and mixed in such proportions that the discharge of the iron takes place according to a single curve of potential, the high-potential curve, thus avoiding the formation of ferric-compounds.

In testimony, that we claim the foregoing as our invention, we have signed our names in presence of two subscribing witnesses.

AXEL THEODOR KONSTANTIN ESTELLE.
KARL WILHELM HENRIK EVERS.

Witnesses:
H. WAHLSTRÖM,
SVEN PEHRSSON.